United States Patent [19]

Jones et al.

[11] Patent Number: 4,906,843

[45] Date of Patent: Mar. 6, 1990

[54] COMBINATION MOUSE, OPTICAL SCANNER AND DIGITIZER PUCK

[75] Inventors: Terrill H. Jones, San Diego; Dale H. Sundby; Steven A. Wright, both of La Jolla, all of Calif.

[73] Assignee: MARQ Technolgies, San Diego, Calif.

[21] Appl. No.: 254,446

[22] Filed: Oct. 6, 1988

Related U.S. Application Data

[63] Continuation-in-part of Ser. No. 139,986, Dec. 31, 1987, abandoned, and a continuation-in-part of Ser. No. 249,781, Sep. 27, 1988, abandoned.

[51] Int. Cl.$^4$ .................. G01V 9/04; G06K 7/10
[52] U.S. Cl. ......................... 250/221; 360/2; 235/449; 235/472; 340/710
[58] Field of Search .............. 382/59, 64, 65, 13; 340/710; 250/221, 231 SE, 237 G, 566; 235/472, 449; 360/2; 369/15

[56] References Cited

U.S. PATENT DOCUMENTS

| | | | |
|---|---|---|---|
| 3,996,557 | 12/1976 | Donahey | 382/13 |
| 4,029,944 | 6/1977 | Trenkamp | 382/64 |
| 4,354,102 | 10/1982 | Burns et al. | 340/710 |
| 4,581,761 | 4/1986 | Ichinokawa et al. | 382/59 |
| 4,621,189 | 11/1986 | Kumar et al. | 235/472 |
| 4,637,264 | 1/1987 | Takahashi et al. | 250/237 G |
| 4,767,923 | 8/1988 | Yuasa | 250/221 |
| 4,804,949 | 2/1989 | Faulkerson | 382/59 |
| 4,818,978 | 4/1989 | Kurihara et al. | 340/710 |

FOREIGN PATENT DOCUMENTS

0116026 6/1985 Japan ........................ 340/710

OTHER PUBLICATIONS

Nomura et al., "Mouse" *IBM Tech. Disc. Bull.*, vol. 27, No. 6, 11/84, pp. 3423-3424.

*Primary Examiner*—David C. Nelms
*Assistant Examiner*—Michael Messinger
*Attorney, Agent, or Firm*—Baker, Maxham, Jester & Meador

[57] ABSTRACT

A hand held unit can operate as a mouse to move a cursor on a display, as a hand held optical scanner for entering into a computer characters or graphic information delineated on a work sheet across which the unit is moved, or as a digitizing puck for tracing and digitizing lines or curves on a work sheet laid over a digitizing pad. The unit is connected via an electrical cable to an interface board plugged into an expansion slot inside a personal computer.

16 Claims, 4 Drawing Sheets

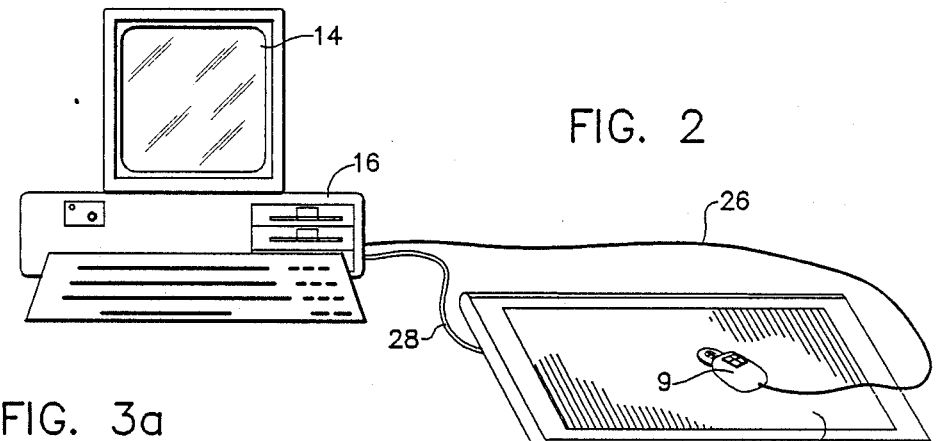
FIG. 2
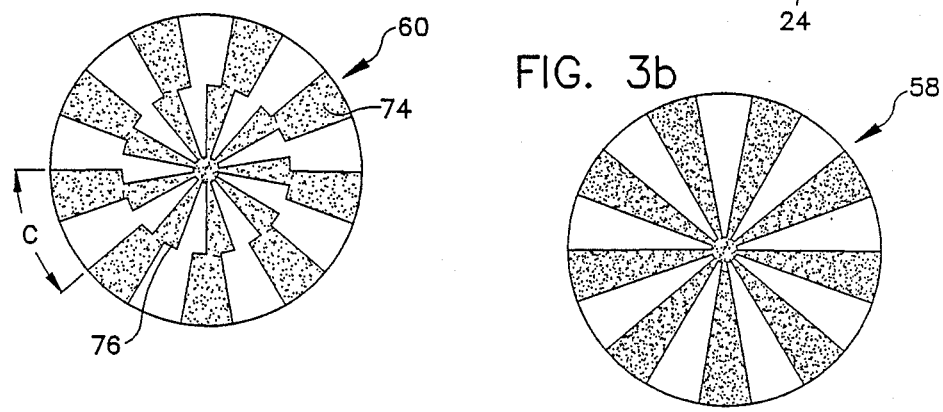
FIG. 3a
FIG. 3b
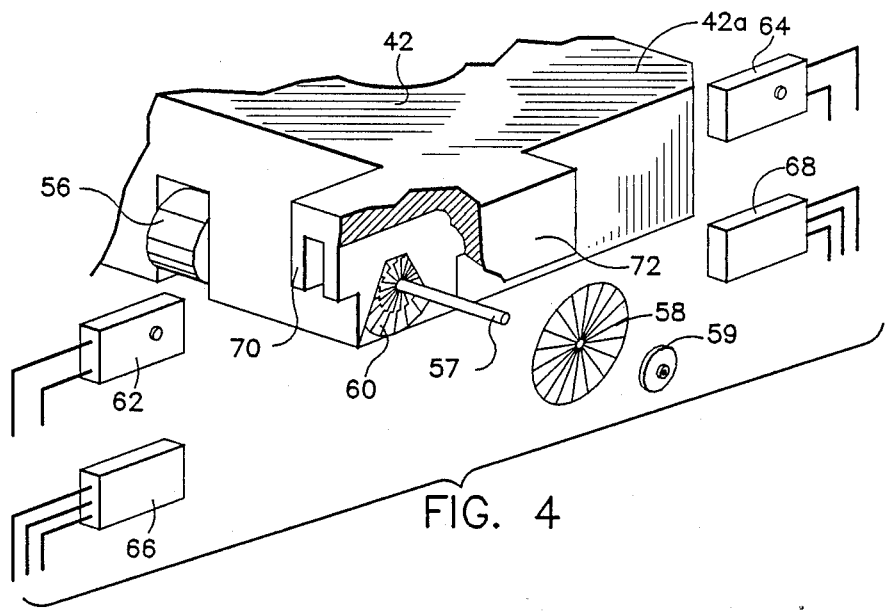
FIG. 4

COMBINATION MOUSE, OPTICAL SCANNER AND DIGITIZER PUCK

CROSS-REFERENCE TO RELATED APPLICATIONS

This application is a continuation-in-part of abandoned U.S. patent application Ser. No. 139,986 filed Dec. 31, 1987 entitled "Combination Mouse and Optical Scanner" having named inventors Terrill H. Jones and Dale H. Sundby and abandoned U.S. patent application Ser. No. 249,781 filed Sept. 27, 1988 entitled "Hand Held Optical Scanner with Light Pipe and User Transparent Mirror" having named inventor Steven A. Wright.

BACKGROUND OF THE INVENTION

The present invention relates to data entry devices for computers, and more particularly, to a hand held device which can selectively operate to move a cursor on a CRT, enter textual or graphic information via optical scanning, or enter coordinate information based on relative positioning of the device with respect to an underlying digitizer pad.

Hand held mouse devices are well known which are manually movable over a desk top to position a cursor on the screen of a personal computer. Typically they incorporate track balls or other surface engaging means which rotate disk encoders to generate positional data. See for example U.S. Pat. No. Re. 32,633 of Hovey et al. granted Mar. 29, 1988 and assigned to Apple Computer, Inc.

Digitizer systems has also been in use with personal computers for many years, particularly for digitizing and recording graphic data such as lines and curves from a work sheet by tracing over the same, usually with a puck incorporating a cross-hair which facilitates accurate sighting. Typically the work sheet is laid over a digitizing pad having embedded therein conductor grids which inductively cooperate with a flux producing element in the puck. See for example U.S. Pat. No. 4,689,448 of Synder et al. granted Aug. 25, 1987 and assigned to Summagraphics Corporation.

More recently hand held optical scanners have been commercially available for entering text directly into a personal computer. Light from a hand held device is reflected off the page to create an image on a charge coupled device (CCD). In some cases, the operator programs the device to recognize a particular character size and font. The device is then manually slid along each line of text in order to enter the information character by character. Processing circuitry connected to the CCD provides ASCII signals to the personal computer representative of each of the characters scanned. Some of these hand held optical scanners are based on a pattern recognition approach. However the accuracy of such hand held optical text entry devices is marginal, partly due to the fact that sighting is difficult and they do not incorporate position sensing means. Furthermore, they are not capable of entering non-textural graphic information directly into a computer.

Presently a user must purchase a separate mouse, optical scanner and digitizing system and connect the same to his or her personal computer in order to have all of the foregoing capabilities available for a common application. Such capabilities are rapidly becoming essential for many financial, engineering and scientific programs. Apart from the substantial expense, the multiple devices lead to physical clutter on the desk top, where space is already at a premium, especially taking into consideration the fact that the user already has a conventional keyboard input device. Multiple input devices have duplicate power supplies and serializers. Furthermore, the convenient use of a plurality of such data entry devices with a single personal computer can be hampered by physical interconnection, data entry port and interface limitations. Several card slots are required for multiple input devices, but more demanding are the software implications of multiple input devices which must compete for the single data stream input to an application. The original architecture of the personal computer was not designed to support this diversity of input devices. In many cases it is the last device loaded that works, locking out all other devices. In some cases, dissimilar types of input cannot even reside in the same machine because of memory conflicts. There is no logical control system to provide pre-processing necessary to satisfy the limited resource managers resident in the typical personal computer hardware and software.

SUMMARY OF THE INVENTION

It is therefore the primary object of the present invention to provide a flexible and reconfigurable manually operated data input device for a personal computer.

According to the present invention a hand held unit can operate as a mouse to move a cursor on a display, as a hand held optical scanner for entering characters or graphic information delineated on a page across which the unit is moved, or as a digitizing puck for tracing lines or curves on a work sheet laid over a digitizing pad. The unit may be connected via an electrical cable to an interface board plugged into an expansion slot inside a personal computer. When operating in a mouse mode, a track ball or other surface engagement means drives a pair of position transducers, which may comprise X and Y encoder disks and associated emitter-detector pairs, to generate signals used to position a cursor on a CRT. When operating in a scanning mode, signals from an optical transducer in a removable scanning head as well as signals from the position transducers are utilized by the interface board to input characters into the computer in ASCII form when text is scanned or graphic information when images are scanned. When operating in a digitizing mode, a flux producing element in a removable digitizer puck inductively couples with a plurality of grid conductors in an underlying digitizer pad to thereby generate signals representing the coordinates of the puck relative to the pad.

BRIEF DESCRIPTION OF THE DRAWINGS

FIG. 2 illustrates a digitizer pad with our combined mouse and digitizer puck positioned over the same, the pad being connected to a personal computer.

FIGS. 3a and 3b illustrate suitable complementary patterns for the encoder disks of the mouse.

FIG. 4 is an enlarged, fragmentary exploded perspective view of the track ball cage inside the unit of FIG. 1.

FIG. 7 is plan view of an encoder disk with a third optical pattern which may be used in place of the pattern illustrated in FIG. 3a.

DESCRIPTION OF THE PREFERRED EMBODIMENTS

Figure 1:
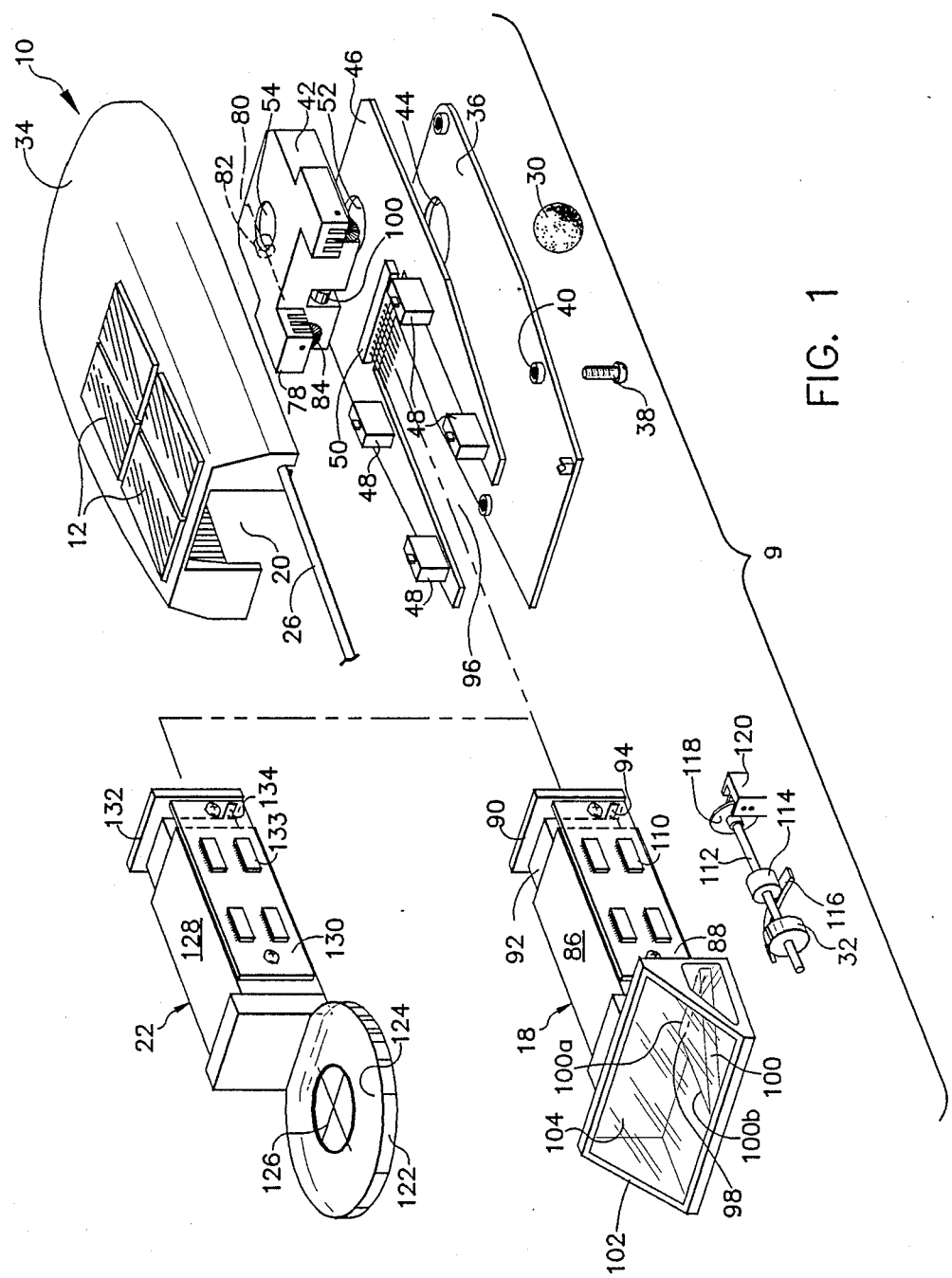
FIG. 1 is an exploded perspective view of a preferred embodiment of a mouse with a scanning head and a digitizer puck illustrated as being alternately connectable to the mouse in accordance with the present invention.
Figure 5A:
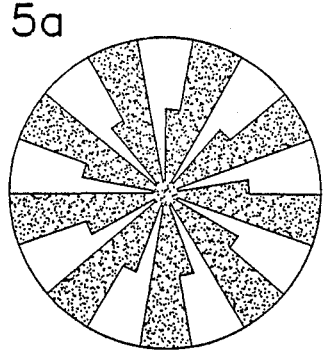
FIGS. 5a–5d are a series of views illustrating the moire pattern effect produced when an optical encoder disk having a pattern of the type illustrated in FIG. 3 is angularly rotated in a counter-clockwise direction in successive ten degree increments in superimposed relation relative to a stationary optical encoder disk of the type illustrated in FIG. 3b.
Figure 5B:
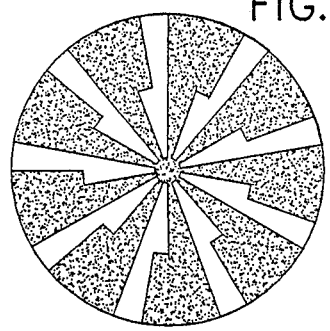
Figure 5C:
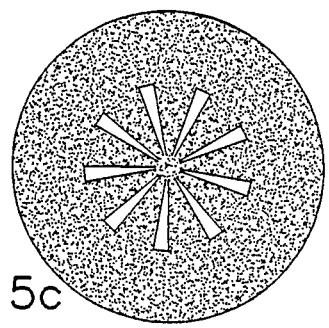
Figure 5D:
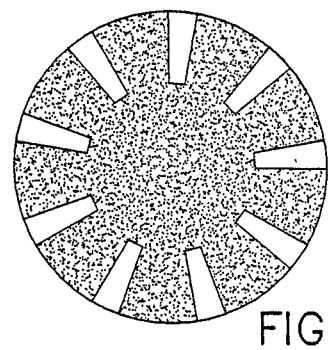

FIG. 1 illustrates the construction of a preferred embodiment of a hand held unit 9 embodying our invention. It includes a housing 10 having function keys 12 on an upper side thereof. In a mouse mode, signals from a pair of position transducers in the unit are processed to move a visible cursor on a CRT 14 (FIG. 2) connected to a personal computer 16. A removable scanning head 18 (FIG. 1) may be plugged into a receptacle 20 in the front end of the housing 10 so that the unit may operate in a scanning mode for entering characters or graphic information delineated on a work sheet, page or other media into the computer. Alternatively a removable digitizer puck 22 may be plugged into the housing 10 in lieu of the scanning head so that the unit may operate in conjunction with a conventional digitizer pad 24 (FIG. 2) for tracing lines and curves on a work sheet laid over the pad and thereby entering the same into the computer.

The unit is connected via electrical cable 26 (FIG. 1) to an interface board (not shown) plugged into an expansion slot inside the personal computer 16. When operating in a text scanning mode, signals from an optical transducer in the hand held unit as well as signals from the position transducers are utilized by the interface board to input characters into the personal computer in ASCII form when text is scanned or graphic information when images are scanned. When operating in a graphics scanning mode, images on the work sheet are entered into the computer by "painting" over the same with the unit. When operating in a digitizer mode, the digitizer pad 24 (FIG. 2) is also connected via cable 28 to the interface board.

A portion of the hand held unit 9 may be used solely as a mouse, without the optical scanning in which case neither the scanning head nor the digitizer puck need be plugged into the housing 10 and a simple removable plate (not shown) may cover the receptacle 20 (FIG. 1). Alternatively, the receptable may be covered by a spring loaded door. Signals representative of the amount and direction of manually directed movement of the unit over a surface in both the X and Y directions are generated via two position transducers driven by surface engagement means in the form of a track ball 30 mounted in the underside of the unit. The unit has an additional surface engagement means in the form of a "third wheel" 32 mounted in the scanning head 18 which drives a third position transducer. The third transducer generates signals representative of the amount and direction of rotation of the unit 9 about a vertical axis relative to the surface.

In the mouse mode, the third wheel allows additional user commands, such as rotating a simulated three dimensional drawing in a CAD/CAM program. In the optical scanning mode, the third wheel allows graphic information to be entered into the computer with a paint brush style of motion of the unit over the image in which twisting of the hand held unit is permissible, in addition to moving it in the X and Y directions.

Referring now in detail to FIG. 1, the housing 10 of the unit includes rounded top cover 34 and a flat base 36 removably secured to the top cover via screws 38 which extend through holes 40 in the base into the cover. The top cover and base may be economically injection molded of a suitable plastic to provide an aesthetic appearance and durable construction. The top cover is ergonomically configured and dimensioned to facilitate a comfortable grasping thereof by a person while providing adequate interior volume for enclosing the operative components hereafter described. The base 36 is normally horizontal and co-planar with the desk top surface or worksheet being scanned.

Referring still to FIG. 1, the track ball 30 is contained within a molded plastic box-like mount or cage 42. This cage captures the track ball so that it extends through an aperture 44 in the base 36 for rolling over a surface such as a desk top or work sheet supported on the desk top. Various electronic components of the unit 9 are supported and electrically connected on a generally U-shaped printed circuit board 46. These include four function switches 48 and a multi-pin male electrical connector 50. The switches 48 are positioned underneath the function keys 12 mounted on the top cover 34. The switches 48 can be individually actuated by depressing the corresponding function keys 12. These keys may be used to conveniently actuate functions normally actuated via a conventional keyboard also connected to the computer. Such functions may include ENTER, RETURN, etc.

The printed circuit board 46 (FIG. 1) has an aperture 52 aligned with the aperture 44 in the base 36 so that the lower portion of the track ball 30 can project through the same. The track ball cage 42 has an aperture 54 (FIG. 1) in an upper wall 42a (FIG. 4) thereof through which an upper portion of the track ball 30 projects. The sizing of the apertures 44, 52 and 54 and the spacing therebetween is sufficient to permit the track ball 30 to "float" inside the cage 42 to a limited extent to facilitate driving engagement with rollers that drive transducer means as hereafter described.

The unit 9 (FIG. 1) has three position transducer means, a pair of which generate signals indicating movement in the X-Y directions and a third one of which generates signals indicating rotational movement of the unit about a vertical axis. A resilient ball roller 56 is mounted to an inner end of a first shaft 57 (FIG. 4) journaled in holes extending through portions of the track ball cage 42. The shaft 57 is positioned for rotation as a result of a driving engagement between the ball roller 56 and the track ball 30 constrained within the cage 42. The outer end of the first shaft is rigidly connected to the center of a first encoder disk 58 via end cap 59. A second encoder disk 60 is positioned in a stationary manner directly opposing the first encoder disk. The shaft 57 extends through a slightly larger diameter hole in the center of the second encoder disk 60. Therefore rotation of the track ball 30 along the Y axis rotates the first encoder disk 58 relative to the second encoder disk 60.

The first and second encoder disks 58 and 60 (FIG. 4) have first and second optical patterns as hereafter described so that rotation of the first encoder disk relative to the second encoder disk creates a so-called "moire" effect. For example, the first encoder disk 58 (rotating in FIG. 4) may have an optical pattern similar to that illustrated in FIG. 3a and the second encoder disk 60 (stationary in FIG. 4) may have an optical pattern similar to that of FIG. 3b. These patterns may be made of alternating opaque and transparent sectors, such as those which can be created on clear films, or by having alternating slots molded or otherwise formed in a disk of opaque material.

The complementary first and second encoder disks 58 and 60 are both positioned in the beam paths of two emitter/detector pairs consisting of photoemitters 62 and 64 (FIG. 4) and photodetectors 66 and 68. These solid state components are mounted in slots formed by flanges 70 of a first position transducer mounting bracket 72 which extends from one side of the track ball cage 42. The flanges and the site wall which have cutout regions (not visible) so that the beam from each photoemitter can travel in unobstructed fashion through both disks 58 and 60 to its corresponding photodetector.

By placing an additional encoder disk 60 (FIG. 3b) in a stationary manner next to a rotating optical encoder disk having an optical pattern such as the disk 58 (FIG. 3a), the need to precisely place the photodectors is negated. In the example, the encoder disks 58 and 60 (FIGS. 3a and 3b) each have alternating twenty degree-wide transparent and opaque sectors which are illustrated by the stipling in the drawings. The sectors 74 of the outer track of the disk 60 are one-quarter cycle (C) out of phase with the sectors 76 of the inner track. The purpose of the phase delay is two-fold: (1) it allows the direction of movement to be easily discerned; and (2) it doubles the effective line resolution. Other phase differences besides one-quarter cycle will also work although this amount provides maximum allowance for tolerance variances during manufacture.

One emitter/detector pair has its beam intercepted by the outside sectors 74 (FIG. 3b) of the stationary encoder disk 60. The other emitter/detector pair has its beam intercepted by the inside sectors 76 of the stationary encoder disk 60. The leads of the solid state components 62, 64, 66 and 68 are connected to the printed circuit board 46 (FIG. 1). Thus it will be understood that the signals generated by the photodetectors 66 and 68 can be sent via cable 26 to the interface board in the personal computer. These quadrature signals are processed to determine the amount and direction of movement of the hand held unit 9 in the Y direction over the desk or other surface over which the track ball 30 rolls.

Both disks 58 and 60 are positioned between two emitter and detector pairs with the radiation from each emitter passing through each disk to its corresponding detector. Stated another way, the encoder disks are both positioned in a beam path of each of the emitter/detector pairs. One emitter/detector pair is associated with the outer track (sectors 74) of disk 60 while the other emitter/detector pair is associated with the inner track (sectors 76) of the disk 60. As the first disk 58 rotates, a moire fringe pattern effect is created. The entire outer-half of the disk 58 lets the same amount of light through as the corresponding portion of the disk 60. The same holds true for the inner track of the disk 58 with respect to the corresponding portion of the disk 60. When the disk 58 is rotated in a counter-clockwise direction, then for each cycle C of movement of the disk 58 (FIG. 3a) relative to the stationary disk 60 (FIG. 3b) the patterns in FIGS. 5a–5d emerge, in that order. The moire fringe pattern effect is a shimmering effect, and is sometimes referred to herein as simply the "moire effect."

Figure 6A:
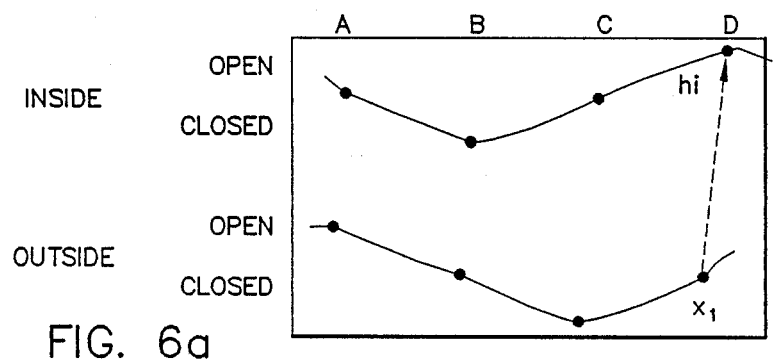
FIG. 6a is a graph depicting the amplitudes of the output signals of two optical emitter/detector pairs when encoder disks having optical patterns similar to those illustrated in FIGS. 3a and 3b are positioned in their beam paths and the disk with the FIG. 3a pattern is rotated in a counter-clockwise direction in superimposed relationship to the stationary encoder disk with the FIG. 3b pattern.
Figure 6B:
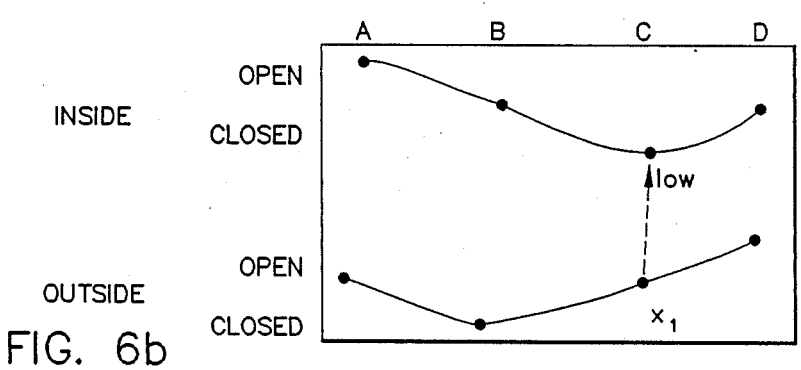
FIG. 6b is a graph depicting the amplitudes of the output signals of two optical emitter/detector pairs when encoder disks having optical patterns similar to those illustrated in FIGS. 3a and 3b are positioned in their beam paths and the disk with the FIG. 3a pattern is rotated in a clockwise direction in superimposed relationship to the stationary encoder disk with the FIG. 3b pattern.

The graph of FIG. 6a illustrates the output signals of the two detectors during counter-clockwise rotation of the disk 58 through one cycle C relative to the disk 60. The output signals can be said to be in quadrature relation. When the disk 58 rotates in the clockwise direction relative to the disk 60, the output signals from the detectors will be those illustrated in the graph of FIG. 6b. If the inside wave form is sampled every time the outside crosses the median on rising edge (X1), then the direction of rotation can be discerned.

With this moire fringe pattern approach, mice can be constructed with resolution one-hundred times greater than those presently available commercially. By utilizing an area much larger than a single line, i.e. the areas of the entire tracks, less precise beam angles and component alignments can yield the same precision as one complete cycle per line width.

The disks 58 and 60 can be made of transparent film with the required opaque patterns screened, printed or otherwise formed thereon. The actual width of a beam may be large compared to the width of a sector. For example, each beam may have a width of one-quarter the entire diameter of a disk. Thus the beam may be split by several opaque bars at once from a single one of the disks. The angular placement of the two emitter/detector pairs is not critical, so long as one beam travels through the outer track and the other beam travels through the inner track.

Figure 7:
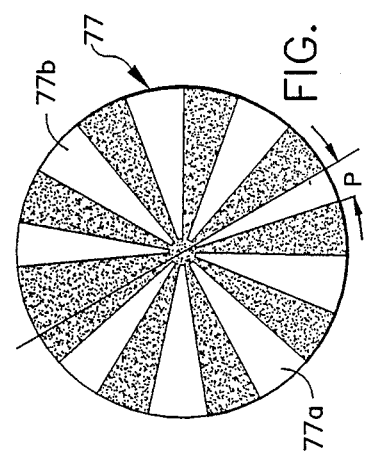

Different patterns and implementations can be utilized to create a similar moire effect. An example of a replacement pattern for that of FIG. 3b is illustrated in the form of disk 77 in FIG. 7. The left and right halves 77a and 77b of the pattern are analogous to the inner and outer tracks of the optical encoder disk 60 of FIG. 3b. These pattern halves 77a and 77b provide a ninety-degree phase delay P. In this embodiment, the beam of one emitter/detector pair should be on one side 77a of the pattern and the beam of the other emitter/detector pair should be on the other side 77b the pattern in order to detect direction. The beams should not have their centers on the same diameter in order to avoid other undesirable effects.

Referring again to FIG. 1, a similar arrangement is provided in the unit 9 for generating signals representing the amount and direction of movement of the unit in the X direction over the surface engaged by the track ball. A second transducer mounting bracket 78 extends from a forward end of the track ball cage 42. A second shaft 80 is driven by another resilient ball roller 82 that engages the track ball 30 at a side location spaced ninety degrees from the location where the track ball is engaged by the other roller 56. First and second encoder disks having patterns like those illustrated in FIGS. 3a and 3b, including an outer rotating encoder disk 84 visible in FIG. 1 are utilized to generate the moire effect as described above. Another two emitter/detector pairs (not visible) which are mounted in the second transducer mounting bracket 78 have their beams intercepted and chopped by this second pair of complementary stationary and rotating encoder disks. The leads of these emitter/detector pairs are connected to the printed circuit board 46 which is in turn connected via cable 26 to the interface board in the computer 16.

Details of the scanning head 18 of the unit are also visible in FIG. 1. It includes a hollow optics housing 86 having a printed circuit board 88 mounted on one side thereof. Another printed circuit board 90 is connected to the rear end of the optics housing 86. An optical transducer, such as a linear charge coupled device (CCD) 92, is mounted on the forward face of printed circuit board 90 in position for having radiation transmitted rearwardly thereto through the optics housing 86. A multi-pin female electrical connector 94 is mounted on the rearward face of the printed circuit board 90. This female connector 94 mates with male connector 50 connected to circuit board 46 when the rearward portion scanning head 18 is plugged into the receptacle 20 in the housing 10. It will be noted that the circuit board 46 inside the hand held unit has a large cut-out region 96 to provide clearance for receiving the rear portion of the scanning head 18. Preferably the optics housing 86 has rails and detents, or some other suitable means not illustrated for providing a rigid, yet quickly detachable, mechanical connection between the scanning head 18 and the main mechanical elements of the mouse portion of the unit.

The CCD 92 (FIG. 1) consists of a row of light sensitive elements. Inside the optics housing 86 a source of illumination 98, lens (not illustrated) and a light pipe 100 are contained for illuminating characters or other visible information beneath a wedge-shaped projector 102 at the forward end of the scanning head.

The source of illumination which is illustrated simply as phantom line 98, preferably emits radiation in a broad bandwidth. This source may comprise a plurality of incandescent bulbs, LEDs, laser diodes or other suitable illumination means. The light pipe 100 is a triangular shaped piece of clear or translucent material such as polystyrene or other plastic. This body of material receives radiation at its rear end 100a and directs it via internal reflectance down through its beveled forward edge 100b to a predetermined portion of the surface adjacent the housing, preferably in the form of a visible band. The light pipe extends substantially co-planar with the base 36 of the housing. An optical transducer in the form of CCD 92 receives radiation in a first portion of the broad bandwidth and generates electrical signals representative thereof. A dichroic mirror 104 is connected to the housing and is positioned at a suitable inclination above the predetermined portion of the surface for reflecting to the optical transducer (CCD) radiation in the first portion of the bandwidth reflected upwardly off the surface. This mirror is designated by the shading lines in FIG. 1. The dichroic mirror is substantially transparent to visible radiation in a second portion of the bandwidth so that a person can look downwardly through the mirror and through the transparent light pipe to observe the characters or other visible features located in the predetermined portion of the surface, i.e. the location on the work sheet.

The optical transducer 92 preferably is responsive in the near infrared range, from 600 to 1000 nanometers in wavelength. In this region, the eye has little or no response since its best sensitivity is in the 350 to 600 nanometer wavelength region. The dichroic mirror 104 in the preferred embodiment can transmit the energy most desired to the active face of the optical transducer and yet transmit to the users eye, all the visible information from the illuminated page. This, when combined with either remote illumination or a light pipe, gives the user a clear view of the text.

The dichroic mirror 104 may be fabricated using techniques well known in the art of mirror making. See for example The Design of Optical Systems, by Warren J. Smith, pages 174 et seq. published by McGraw-Hill Book Company, 1966. For example, one or more thin films of metals (e.g. aluminum, gold silver, rhodium) are evaporated onto a glass substrate in precise thicknesses. A thin protective layer of either silicon monoxide or magnesium fluoride is then applied after all the thin metal films have been deposited.

Suitable drive electronics for the radiation source 98 and the CCD, as well as amplifying circuitry, may be provided in the form of integrated circuits 110 (FIG. 1) mounted on the printed circuit board 88. The components on the two printed circuit boards 88 and 90 are electrically connected to the female connector 94. This female connector plugs into male connector 92 attached to the U-shaped printed circuit board 46 in the housing 10 of the mouse portion of the unit.

In the preferred embodiment of the unit 9, the CCD 92 has a single row of 256 light sensitive elements. The 256 light sensitive elements of the CCD are sequentially activated at a frequency determined by clock circuitry on the interface board, thus generating electrical signals in the form of a serial string of data representing the light and dark portions of the vertical band being scanned. This sequential activation of the CCD elements is repeated at a very high rate or frequency as the hand held unit is moved across the surface. The position signals from the position transducers tell the interface board where the scanned vertical bands are located relative to each other. Therefore, the output signals from the unit can be used by the interface board to reconstruct in the computer the characters, graphic or other information scanned by the unit.

An additional surface engagement means is mounted in the scanning head 18. It drives a third position transducer that generates signals representative of both the amount and direction of rotation of the unit about a vertical axis extending substantially perpendicular to the base 36 and the surface. This surface engagement means may comprise the third wheel 32 (FIG. 1) rigidly mounted on a shaft 112 for rolling over the surface engaged by the track ball 30. A forward end of the shaft is mounted in a vertical slot (not illustrated) formed in a forward lower end of the optics housing 86. An intermediate portion of the shaft is journaled in a bearing 114 which is retained in a bearing seat (not visible) in the underside of the housing 86 by a retainer spring 116. A rotating encoder disk 118 is mounted to the rearward end of the shaft 112 adjacent and opposite a stationary encoder disk (not visible). The encoder disks are positioned between flanges of a sensor housing 120 mounted to the underside of the optics housing 86. Two emitter/detector pairs (not illustrated) are mounted in the sensor housing 120 so that their beams are intercepted by the two encoder disks. The encoder disks have optical patterns for producing a moire effect so that the output signals of the detectors represent both the amount and direction of rotation of the shaft with a very high degree of resolution. The leads from the emitter/detector pairs in the sensor housing 120 are connected to the printed circuit board 88 or 90.

Referring again to FIG. 1, the digitizer puck 22 includes a flux producing element which inductively couples with a plurality of grid conductors in the conventional digitizer pad 24 (FIG. 2) to thereby generate signals representing the coordinates of the puck relative to the pad. The digitizer puck 22 includes a round frame 122 (FIG. 1) that encloses the flux producing or receiving element which may conveniently take the form of a coil of wire (not visible). A transparent sight 124 extends across the round frame and has a cross-hair 126 for aiding in accurately moving the puck along lines or curves on a work sheet. The round frame 122 is rigidly connected to an elongate puck support housing 128 similar in configuration to optics housing 88 of the scanner. The puck housing 128 carries printed circuit boards 130 and 132. The board 130 carries the circuitry 133 which is coupled to the coil in the round frame. This circuitry is in turn connected to a multi-pin female connector 134 mounted to the printed board 132 at the rear end of the puck support housing 128. The puck support housing 128 may be inserted through the receptacle 20 in the mouse housing 10 and into the recess 96 in the U-shaped printed circuit board 46. This permits the connection of female connector 134 with male connector 50. The puck support housing 128 snaps into mechanical engagement with the mouse housing 20. Thereafter the cable 26 from the unit 9 is plugged into the interface board in the computer 16 (FIG. 2). The conventional digitizer pad 24 is also connected to the same interface board via cable 28 as shown in FIG. 2. Signals representative of the coordinate position of the intersection of the cross hair 126 relative to the underlying pad are processed by the interface board in the computer 16. In the digitizer mode of our unit, signals from the position transducers of the mouse portion of the unit are not used, even though the track ball 30 rolls along the work sheet laid over the digitizer pad. The manner in which the coil interacts with the grid of conductors in the pad to create the coordinate data is otherwise conventional. Either the grid may be directly energized with currents and the signals induced in the coil monitored, or visa versa.

Figure 8:
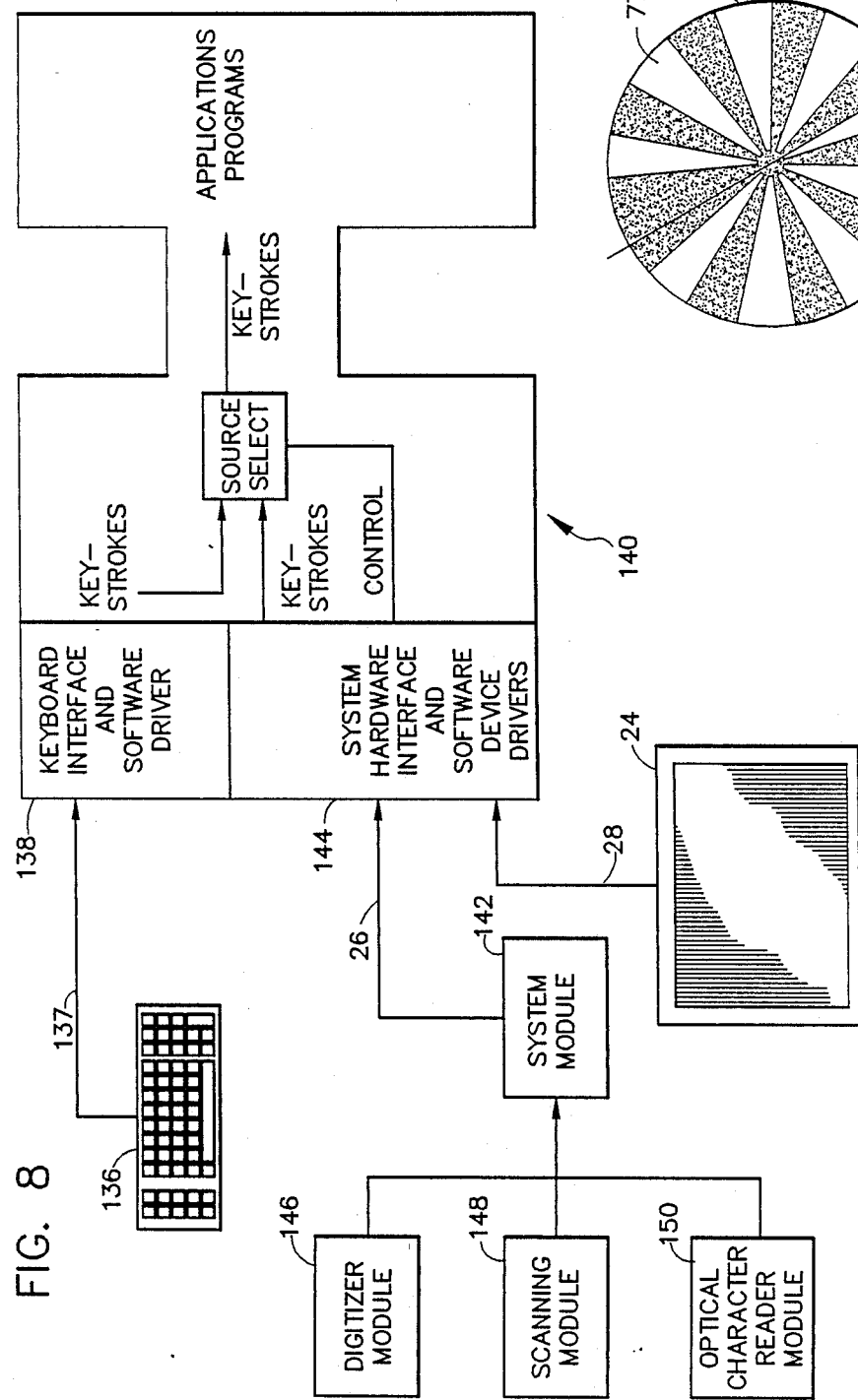
FIG. 8 is a block diagram illustrating the manner in which our combined mouse/scanner/digitizer interfaces with a personal computer.

FIG. 8 is a block diagram illustrating the manner in which our combined mouse/scanner/digitizer unit 8 interfaces with a personal computer. A conventional keyboard 136 is connected via cable 137 to a conventional keyboard hardware and software device driver 138 resident in a conventional IBM compatible personal computer 140. A system module 142 resident in the mouse portion of the unit 8 is connected to a system hardware interface and software device driver 144 provided in the form of a single printed circuit board that plugs into a single expansion slot of the personal computer. This driver may consist not only of dedicated circuitry on the expansion board, but software loaded into the memory of the personal computer via floppy disk or tape. A digitizer module 146 comprising circuitry carried by the removable digitizer puck 22 is connectable to the system module 142. The conventional digitizer pad 24 is also connected to the system hardware interface and software device driver 144. An optical scanning module 148 comprising circuitry carried by the scanning head 18 is connectable to the system module for allowing graphic information to be scanned and inputted. An optical character recognition module 150 comprising circuitry carried by a different version of the scanning head 18 is connectable to the system module for allowing text to be scanned and inputted. The resource allocation system of the standard operating system which is loaded on the personal computer, e.g. MICROSOFT DOS, enables input device selection via keystrokes and permits data from the selected input device to be routed into the selected application programs.

While we have described a preferred embodiment of our data entry device, it should be understood that modifications and adaptations thereof will occur to persons skilled in the art. For example the track ball 30 could be replaced by a pair of orthogonal wheels. Therefore, the protection afforded our invention should only be limited in accordance with the scope of the following claims.

We claim:

1. A hand-held device for inputting into a computer information regarding a relative position of the device during manual movement thereof over a generally planar surface and information representing characters, lines or other visible features delineated on the surface, comprising:

a housing adapted to be grasped by a user and moved along the surface;

surface engagement means mounted in the housing and extending from an underside of the housing for rolling along the surface;

first position transducer means mounted in the housing and driven by the surface engagement means for generating first signals representative of an amount of rolling movement of the surface engagement means along a first axis in a plane of the surface;

second position transducer means mounted in the housing and driven by the surface engagement means for generating second signals representative of an amount of rolling movement of the surface engagement means along a second axis in the plane of the surface which is substantially perpendicular to the first axis;

optical means connectable to the housing for scanning adjacent portions of the surface and generating third signals representative of the characters or other visible features delineated thereon;

digitizer puck means connectable to the housing for generating fourth signals resulting from inductive coupling with an underlying digitizer pad;

means for releasably connecting the optical means to the housing;

means for releasably connecting the digitizer puck means to the housing; and the first and second position transducer means each including encoder means for generating a moire pattern effect and optical means for sensing the moire pattern effect to generate the corresponding first and second signals.

2. A device according to claim 1 wherein the surface engagement means includes a track ball which drives the first and second position transducer means.

3. A device according to claim 1 and further comprising a second surface engagement means connected to the housing for rolling along the surface when the housing is rotated about a third axis substantially perpendicular to the plane of the surface and a third position transducer means driven by the second surface engagement means for generating fifth signals representative of an amount of rotation of the housing about the third axis.

4. A device according to claim 3 wherein the fifth signals generated by the third position transducer means also represent the direction of rotation of the housing about the third axis.

5. A device according to claim 1 wherein the encoder means of each of the first and second position transducer means includes first and second encoder disks having first and second optical patterns including alternately transparent and non-transparent sectors, the first disk being rotated by the surface engagement means in opposing substantially parallel relationship with the second disk which is held stationary, and the optical sensing means of each of the first and second position transducer means includes a first emitter/detector pair and a second emitter/detector pair, a beam of each of said pairs being intercepted by the first and second encoder disks of the corresponding encoder means to generate a pair of output signals.

6. A device according to claim 5 wherein the first and second optical patterns are configured to provide a phase difference in output signals representative of the direction of movement of the surface engagement means along the corresponding axis.

7. A device according to claim 1 wherein the optical means includes:
illumination means for emitting radiation in a predetermined bandwidth;
means connected for directing the radiation from the illumination means to a predetermined portion of the surface adjacent the housing;
optical transducer means for receiving radiation in a first portion of the bandwidth and generating electrical signals representative thereof; and
means positioned above the predetermined portion of the surface for reflecting to the optical transducer means radiation in the first portion of the bandwidth reflected upwardly off the surface, said means being substantially transparent to visible radiation in a second portion of the bandwidth so that a person can look downwardly therethrough and observe the characters or other visible features located in the predetermined portion of the surface.

8. A device according to claim 7 wherein the reflecting means is a dichroic mirror.

9. A device according to claim 8 and further wherein the dichroic mirror forms a downwardly sloped, upper surface of a wedge-shaped projection that extends from the housing.

10. A device according to claim 7 and further wherein the directing means is a body of a substantially rigid translucent material having a rear end that receives radiation from the illumination means and transmits said radiation via internal reflectance to a forward end that projects said radiation onto the predetermined portion of the surface.

11. A device according to claim 10 and further wherein the body of translucent material is dimensioned and configured so that the predetermined portion of the surface onto which the radiation is projected by the body is shaped in the form of a strip.

12. A device according to claim 10 and further wherein the translucent material is polystyrene.

13. A device according to claim 11 and further wherein the body of translucent material has a generally triangular configuration and at least one beveled surface at the forward end for emitting the radiation.

14. A device according to claim 7 and further wherein the directing means and the reflecting means are mounted in a generally wedge-shaped projection connected to one end of the housing.

15. A device according to claim 1 wherein the digitizer puck means includes a flux producing or receiving element.

16. A device according to claim 15 wherein the digitizer puck means further includes a sighting element.

* * * * *